US012770496B2

(12) United States Patent
Ogawa et al.

(10) Patent No.: US 12,770,496 B2
(45) Date of Patent: Oct. 20, 2026

(54) ABNORMALITY DETECTION SYSTEM FOR DETECTING ABNORMALITIES IN VEHICLE CABIN

(71) Applicant: DENSO CORPORATION, Kariya-city (JP)

(72) Inventors: Masahiro Ogawa, Kariya-city (JP); Kunihiko Hayashi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 68 days.

(21) Appl. No.: 18/908,165

(22) Filed: Oct. 7, 2024

(65) Prior Publication Data

US 2025/0029473 A1 Jan. 23, 2025

Related U.S. Application Data

(63) Continuation of application No. PCT/JP2023/015378, filed on Apr. 17, 2023.

(30) Foreign Application Priority Data

Apr. 27, 2022 (JP) ................................ 2022-073548

(51) Int. Cl.
*G08B 21/18* (2006.01)
*G06T 7/70* (2017.01)
(Continued)

(52) U.S. Cl.
CPC ................ *G08B 21/24* (2013.01); *G06T 7/70* (2017.01); *G06V 10/141* (2022.01); *G06V 20/59* (2022.01);
(Continued)

(58) Field of Classification Search
None
See application file for complete search history.

(56) References Cited

U.S. PATENT DOCUMENTS 6,169,282 B1 1/2001 Maeda et al.
2002/0031248 A1 3/2002 Maed et al.
(Continued)

FOREIGN PATENT DOCUMENTS

JP H11132959 A 5/1999
JP 3162012 B2 4/2001
(Continued)

*Primary Examiner* — John F Mortell
(74) *Attorney, Agent, or Firm* — Harness, Dickey & Pierce, P.L.C.

(57) ABSTRACT

An abnormality detection system includes a cloud and an on-board device communicatively connected to the cloud, and further includes multiple applications each configured to detect the abnormality as a target based on image data of an image captured by a camera. The detection unit is configured to: analyze the image data and detect the abnormality when each of the multiple applications is executed, transmit, to the cloud, an analysis result analyzed by the detection unit, transmit, to the cloud, at least the image data from which the abnormality is detected. The cloud includes a storage unit that stores the analysis result and the image data transmitted from the on-board device. The abnormality detection system notifies, using at least one of the on-board device or the cloud, a notification target of the analysis result.

12 Claims, 10 Drawing Sheets

(51) Int. Cl.
*G06V 10/141* (2022.01)
*G06V 20/59* (2022.01)
*G08B 21/24* (2006.01)

(52) U.S. Cl.
CPC ............... *G06T 2207/10048* (2013.01); *G06T 2207/30268* (2013.01)

(56) References Cited

U.S. PATENT DOCUMENTS

| | | | |
|---|---|---|---|
| 2017/0098364 | A1 | 4/2017 | Jaegal |
| 2019/0176769 | A1 | 6/2019 | Strasdat et al. |
| 2019/0291699 | A1 | 9/2019 | Nakatsuka et al. |
| 2019/0299877 | A1 | 10/2019 | Saito et al. |
| 2021/0190516 | A1* | 6/2021 | Ventimiglia ....... G01C 21/3438 |
| 2022/0004778 | A1* | 1/2022 | Ishiko .................... G06V 20/59 |
| 2022/0250589 | A1* | 8/2022 | Schmalenberg .......... B60S 1/64 |

FOREIGN PATENT DOCUMENTS

| | | | |
|---|---|---|---|
| JP | 2005115911 | A | 4/2005 |
| JP | 4419672 | B2 | 2/2010 |
| JP | 2019153932 | A | 9/2019 |
| JP | 2019167077 | A | 10/2019 |
| JP | 2019172191 | A | 10/2019 |
| JP | 2019527650 | A | 10/2019 |
| JP | 2019205078 | A | 11/2019 |
| JP | 2022014372 | A | 1/2022 |

* cited by examiner

ABNORMALITY DETECTION SYSTEM FOR DETECTING ABNORMALITIES IN VEHICLE CABIN

CROSS REFERENCE TO RELATED APPLICATIONS

The present application is a continuation application of International Patent Application No. PCT/JP2023/015378 filed on Apr. 17, 2023, which designated the U.S. and claims the benefit of priority from Japanese Patent Application No. 2022-073548 filed on Apr. 27, 2022. The entire disclosures of all of the above applications are incorporated herein by reference.

TECHNICAL FIELD

The present disclosure relates to a technology for detecting an abnormality such as dirt on a seat in a vehicle cabin.

BACKGROUND

There has been known a technology for detecting dirt in a vehicle cabin. A camera, which is disposed in the vehicle cabin, capturers an image of the interior of the vehicle cabin, and the dirt is detected by analyzing the image captured by the camera. The image captured by the camera is transmitted to a cloud, and is analyzed in the cloud to detect dirt and the like.

SUMMARY

The present disclosure provides an abnormality detection system that detects an abnormality in a vehicle cabin. The abnormality detection system includes a cloud, which collects data of a vehicle, and an on-board device communicatively connected to the cloud. The abnormality detection system includes multiple applications each configured to detect the abnormality as a target based on image data of an image captured by a camera. The camera captures the image indicating an interior of the vehicle cabin. The on-board device includes a detection unit and a transmission unit. The detection unit analyzes the image data and detects the abnormality when each of the multiple applications is executed. The transmission unit transmits, to the cloud, an analysis result analyzed by the detection unit, and transmits, to the cloud, at least the image data from which the abnormality is detected. The cloud includes a storage unit that stores the analysis result and the image data, which are transmitted from the transmission unit. The abnormality detection system notifies, using at least one of the on-board device or the cloud, a notification target of the analysis result.

BRIEF DESCRIPTION OF DRAWINGS

Objects, features and advantages of the present disclosure will become apparent from the following detailed description made with reference to the accompanying drawings.

DETAILED DESCRIPTION

Figure 1:
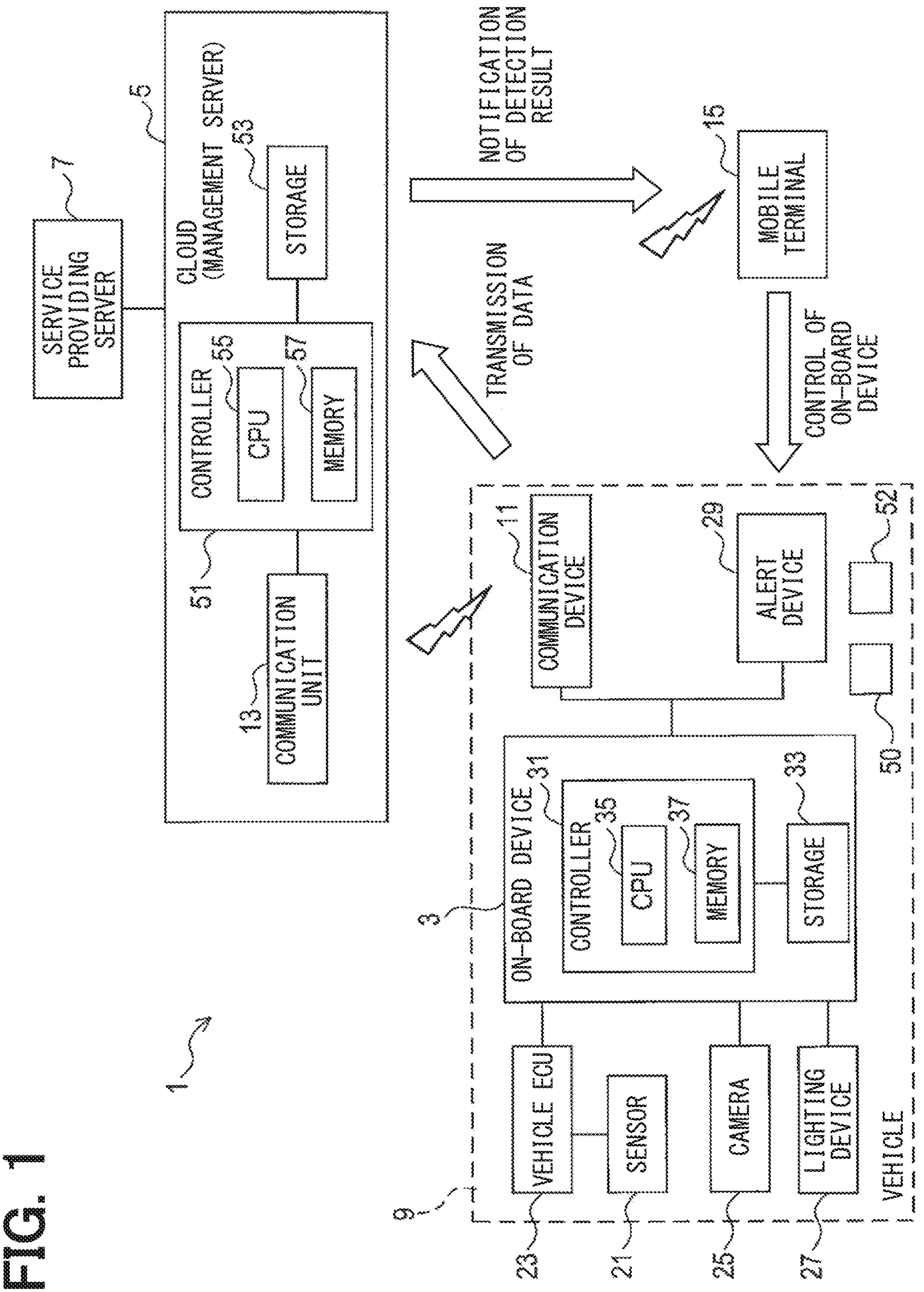
FIG. 1 is an explanatory diagram illustrating an overall configuration of an abnormality detection system according to a first embodiment.

As a result of a detailed study by the inventors of the present disclosure, the following difficulties are found in the above-described technology of the related art.

When an image indicating the interior of the vehicle cabin is captured by the camera and dirt and the like are detected based on the captured image, it is conceivable that some processes are performed on the vehicle side and some processes are also performed on the cloud side. However, there is insufficient consideration as to what kind of process is to be appropriate on each side.

For example, when the technology described above in the related art is applied to a vehicle sharing service (for example, car sharing), there is an insufficient consideration as to what kind of process to be performed on the vehicle side or the cloud side is to be preferable (for example, high convenience) for a business operator of car sharing or a user who uses the vehicle.

According to an aspect of the present disclosure, an abnormality detection system, which detects an abnormality in a vehicle cabin, includes a cloud collecting data of a vehicle and an on-board device communicatively connected to the cloud.

The abnormality detection system includes multiple applications each configured to detect the abnormality as a target based on image data of an image captured by a camera. The camera captures the image indicating an interior of the vehicle cabin.

The on-board device includes a detection unit and a transmission unit. The detection unit analyzes the image data and detects the abnormality when each of the multiple applications is executed. The transmission unit transmits, to the cloud, an analysis result analyzed by the detection unit, and transmits, to the cloud, at least the image data from which the abnormality is detected.

The cloud includes a storage unit that stores the analysis result and the image data, which are transmitted from the transmission unit.

The abnormality detection system notifies, using at least one of the on-board device or the cloud, a notification target of the analysis result.

With the above configuration, in the abnormality detection system according to one aspect of the present disclosure, when communication is performed between the vehicle and the cloud to perform a process related to an abnormality such as dirt in the vehicle cabin, it is possible to provide a technology that is preferable (for example, highly convenient) for, for example, a business operator of car sharing or a user who uses the vehicle.

Specifically, in the abnormality detection system according to one aspect of the present disclosure, when multiple applications are respectively executed in the on-board device, the on-board device analyzes each image data to detect the abnormality, and transmits the analysis result, which is obtained by the detection unit, and at least the image data from which the abnormality is detected (that is, predetermined image data) to the cloud. Meanwhile, the cloud stores the analysis result and the predetermined image data transmitted from the transmission unit. The analysis result is notified to the notification target, such as a business operator or a user, from the on-board device or the cloud.

In this manner, the abnormality detection system according to one aspect of the present disclosure can detect the abnormality such as dirt based on the image data obtained by capturing the image of inside of the vehicle. By transmitting the analysis result, such as an abnormality detection result, and the predetermined image data to the cloud, the analysis result and the image data can be stored in the cloud.

Accordingly, the analysis result and the image data (for example, image data that is a basis for the abnormality) can be stored reliably. This configuration provides a solid basis for taking measures based on the analysis result. Since the analysis result is notified to a business operator or a user, the business operator or the user who receives the notification can take appropriate measures depending on the contents of the notification.

According to another aspect of the present disclosure, an abnormality detection system, which detects an abnormality in a vehicle cabin, includes a cloud collecting data of a vehicle and an on-board device communicatively connected to the cloud.

The abnormality detection system includes a first application and a second application each configured to detect the abnormality as a target based on image data of an image captured by a camera. The camera captures the image indicating an interior of the vehicle cabin. The abnormality detected by the first application has an urgency level higher than an urgency level of the abnormality detected by the second application. The urgency level indicates a level to notify the abnormality in response to the abnormality being detected.

The on-board device includes a first detection unit, a first transmission unit, and a second transmission unit.

The first detection unit analyzes the image data and detecting the abnormality when the first application is executed.

The first transmission unit transmits, to the cloud, an analysis result analyzed by the first detection unit and transmitting, to the cloud, at least the image data from which the abnormality is detected.

The second transmission unit transmits, to the cloud, the image data when the second application is executed.

The cloud includes a first storage unit, a second detection unit, and a second storage unit.

The first storage unit stores the analysis result and the image data transmitted from the first transmission unit when the first application is executed.

The second detection unit analyzes the image data transmitted from the second transmission unit and detects the abnormality. The image data is transmitted from the second transmission unit in response to execution of the second application.

The second storage unit stores the image data transmitted from the second transmission unit and an analysis result analyzed by the second detection unit.

The abnormality detection system notifies, using at least one of the on-board device or the cloud, a notification target of the analysis result.

With the above configuration, in the abnormality detection system according to another aspect of the present disclosure, when communication is performed between the vehicle and the cloud to perform a process related to an abnormality such as dirt in a vehicle cabin, it is possible to provide a technology that is preferable for, for example, a business operator of car sharing or a user who uses the vehicle.

Further, when detecting an abnormality having a high urgent level of notification (that is, high priority), the abnormality detection system promptly notifies the notification target, thereby enabling the notification target, such as a business operator or a user, to take measures based on a content of the notification.

According to another aspect of the present disclosure, an abnormality detection system, which detects an abnormality in a vehicle cabin, includes a cloud collecting data of a vehicle and an on-board device communicatively connected to the cloud and communicatively connected to a relay device that relays a frame communicated through a network of the vehicle.

The on-board device includes an on-board communication unit, a detection unit, and a transmission unit.

The on-board communication unit communicates with an electronic control unit connected to the network of the vehicle via the relay device. The detection unit analyzes image data of an image captured by a camera and detects the abnormality in the vehicle cabin. The camera captures the image indicating an interior of the vehicle cabin. The transmission unit transmits, to the cloud, an analysis result analyzed by the detection unit and transmitting, to the cloud, at least the image data from which the abnormality is detected.

The on-board device notifies the analysis result analyzed by the detection unit toward outside of the vehicle.

With the above configuration, in the abnormality detection system according to another aspect of the present disclosure, when communication is performed between the vehicle and the cloud to perform a process related to an abnormality such as dirt in a vehicle cabin, it is possible to provide a technology that is preferable (for example, highly convenient) for, for example, a business operator of car sharing or a user who uses the vehicle.

According to another aspect of the present disclosure, an abnormality detection method detects an abnormality in a vehicle cabin of a vehicle. An on-board device mounted on the vehicle is communicatively connected with a cloud.

The abnormality detection method prepares multiple applications each configured to detect the abnormality as a target based on image data of an image captured by a camera. The camera captures the image indicating an interior of the vehicle cabin.

The on-board device analyzes the image data and detects the abnormality when each of the multiple applications is executed, transmits an analysis result of the image data and at least the image data from which the abnormality is detected, to the cloud. The cloud stores the analysis result and the image data transmitted from the on-board device.

The abnormality detection method notifies, with at least one of the on-board device or the cloud, the analysis result to a notification target.

With the above configuration, in the abnormality detection method according to another aspect of the present disclosure, when communication is performed between the vehicle and the cloud to perform a process related to an abnormality such as dirt in a vehicle cabin, it is possible to provide a technology that is preferable for, for example, a business operator of car sharing or a user who uses the vehicle.

According to another aspect of the present disclosure, an abnormality detection method detects an abnormality in a vehicle cabin of a vehicle. An on-board device mounted on the vehicle is communicatively connected with a cloud.

The abnormality detection method includes preparing a first application and a second application each configured to detect the abnormality as a target based on image data of an image captured by a camera. The camera captures the image indicating an interior of the vehicle cabin. The abnormality detected by the first application has an urgency level higher than an urgency level of the abnormality detected by the second application, and the urgency level indicates level to notify the abnormality in response to the abnormality being detected.

The on-board device: analyzes the image data and detecting the abnormality when the first application is executed, and transmits an analysis result of the image data and at least the image data from which the abnormality is detected, to the cloud. The on-board device transmits the image data to the cloud when the second application is executed.

The cloud stores the analysis result and the image data, which are transmitted from the on-board device when the first application is executed. The cloud analyzes the image data, which is transmitted from the on-board device when the second application is executed, detects the abnormality, and stores the image data, which is transmitted from the on-board device when the second application is executed, and an analysis result of the image data.

The abnormality detection method notifies, with at least one of the on-board device or the cloud, the analysis result to a notification target.

With such a configuration, in the abnormality detection method according to another aspect of the present disclosure, when communication is performed between the vehicle and the cloud to perform a process related to an abnormality such as dirt in a vehicle cabin, it is possible to provide a technology that is preferable for, for example, a business operator of car sharing or a user who uses the vehicle.

According to another aspect of the present disclosure, an abnormality detection method detects an abnormality in a vehicle cabin of a vehicle. An on-board device mounted on the vehicle is communicatively connected with a cloud that collects data of the vehicle and a relay device that relays a frame communicated through a network of the vehicle.

In the abnormality detection method, the on-board device communicates with an electronic control unit connected to the network of the vehicle via the relay device, detects the abnormality by analyzing image data of an image, which is captured by a camera and indicates an interior of the vehicle cabin, transmits, to the cloud, an analysis result of the image data and at least the image data from which the abnormality is detected. The cloud notifies the analysis result transmitted from the on-board device to a notification target.

With such a configuration, in the abnormality detection method according to another aspect of the present disclosure, when communication is performed between the vehicle and the cloud to perform a process related to an abnormality such as dirt in a vehicle cabin, it is possible to provide a technology that is preferable for, for example, a business operator of car sharing or a user who uses the vehicle.

Hereinafter, embodiments of the present disclosure will be described with reference to the drawings.

1. First Embodiment

In the present first embodiment, an abnormality detection system that detects an abnormality such as dirt in a vehicle (for example, an automobile) will be described as an example of a mobility IoT system. IoT is an abbreviation for Internet of Things.

1-1. Overall Configuration

First, an overall configuration of an abnormality detection system 1 according to the present first embodiment will be described with reference to FIG. 1.

As illustrated in FIG. 1, the abnormality detection system 1 includes an on-board device 3, a cloud 5, and a service providing server 7. A server that manages an operation of the cloud 5 is called a management server.

For convenience, FIG. 1 illustrates only one on-board device 3, and the abnormality detection system 1 may, for example, be provided with multiple on-board devices 3, and the multiple on-board devices 3 may be respectively mounted on different vehicles 9.

The on-board device 3 is capable of wireless communication with the cloud 5 or a mobile terminal 15 via a communication device 11 mounted on the vehicle 9. The detailed configurations of the on-board device 3 and the vehicle 9 will be described below.

The cloud 5 is capable of communicating with the on-board device 3, the service providing server 7, and the mobile terminal 15 via a communication unit 13. The communication unit 13 is capable of wireless communication with the on-board device 3 and the mobile terminal 15. This cloud 5 can collect data of the vehicle 9 from the on-board device 3 via the communication device 11 and the communication unit 13. The detailed configuration of the cloud 5 will be described below.

The service providing server 7 is capable of communicating with the cloud 5. The service providing server 7 is a server installed to provide a service such as managing an operation of the vehicle 9, for example. The abnormality detection system 1 may include multiple service providing servers 7 each providing different service contents.

The mobile terminal 15 is, for example, a mobile terminal (that is, an information terminal) owned by a business operator of car sharing. Examples of the mobile terminal 15 include a smartphone, a tablet terminal, and a notebook PC. In addition to the mobile terminal 15, a desktop computer may be used.

As will be described below, the on-board device 3 may be capable of wirelessly communicating with a mobile terminal 16 (see FIG. 3, for example) of a user via the communication device 11. The cloud 5 may be capable of wirelessly communicating with the mobile terminal 16 of the user via the communication unit 13.

Hereinafter, each configuration will be described in detail below.

1-2. Vehicle Side Configuration

Next, a configuration on the vehicle 9 side will be described with reference to FIGS. 1 to 4.

As illustrated in FIG. 1, in addition to the on-board device 3, the vehicle 9 is provided with a sensor 21, a vehicle ECU 23, a camera 25, a lighting device 27, the communication device 11, and an alert device 29.

The sensor 21 is a detection device that detects a state of the vehicle 9. Examples of this sensor 21 include various sensors that detect a state of an engine, such as on or off, whether a vehicle is starting or stopping, a vehicle speed, a shift position, whether a seat 40 (see, for example, FIG. 3) is occupied or not, whether a door is opened and closed, and locking (that is, locked) or unlocking (that is, unlocked) of the door.

The vehicle ECU 23 is an electronic control unit (that is, ECU) connected to the sensor 21. The vehicle ECU 23 receives signals from the sensors 21, and processes the signals as necessary. The vehicle ECU 23 transmits the signals (that is, information) obtained from the sensors 21 to the on-board device 3 via a communication line.

Figure 3:
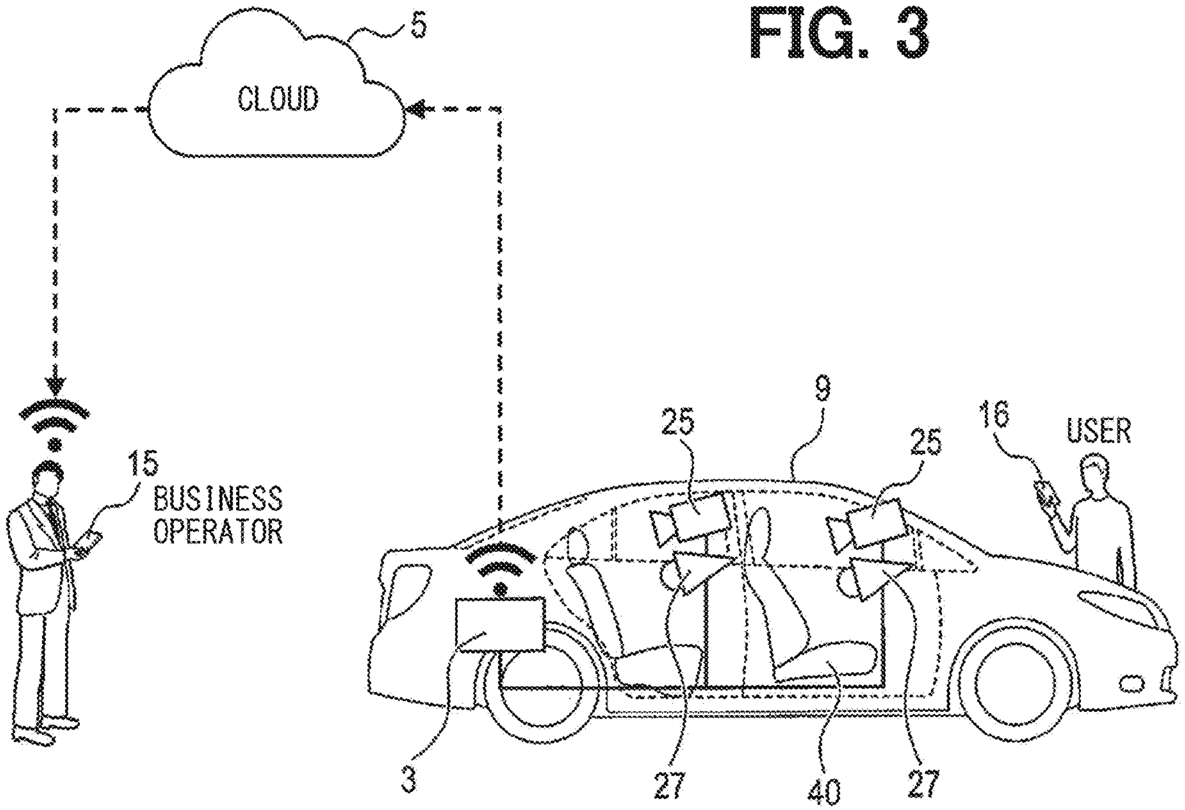
FIG. 3 is an explanatory diagram illustrating a method of using the abnormality detection system according to the first embodiment.

As illustrated in FIG. 3, the camera 25 is one or multiple on-board cameras arranged at an interior of a vehicle cabin to image the interior of the vehicle cabin, and an infrared camera, for example, is used. A digital camera such as a CCD camera may also be used. As the captured image, a color image may be adopted.

An attachment position of the camera 25 may be an upper portion of a windshield, near a rearview mirror, or a ceiling. An imaging range of the camera 25 is set to include a range in which an object is likely to be placed or a range to which dirt is likely to adhere, in the interior of the vehicle cabin. Specifically, the imaging range of the camera 25 is set to include, for example, a part or all of each seat 40 (for example, a seating surface or a backrest portion of the seat 40) of a driver's seat, a front passenger seat, and a rear seat, a dashboard, an inner side surface of the door, or the like.

The multiple cameras 25 may be arranged such that an imaging target can be imaged at different angles to detect a three-dimensional object.

As illustrated in FIG. 3, the lighting device 27 is a light that is turned on to illuminate the interior of the vehicle cabin when the camera 25 images the interior of the vehicle cabin. For example, a light that emits infrared rays or an LED light may be used.

The communication device 11 is a communication device capable of wireless communication with the communication unit 13 of the cloud 5 and the mobile terminals 15 and 16. This communication device 11 transmits image data, an analysis result of the image data, or the like from the vehicle 9 to the cloud 5. As will be described below, the on-board device 3 can be controlled by a signal from the mobile terminal 15.

The alert device 29 is a device that issues a warning to a user or the like of the vehicle 9 by an electronic sound, a voice, or the like. As the alert device 29, a speaker or the like may be adopted.

(Network Inside Vehicle)

A configuration related to a network inside the vehicle 9 to which the on-board device 3 is connected will be described. The on-board device 3 can be retrofitted and connected to the network inside the vehicle 9 to be capable of communicating with the vehicle ECU 23 and the like.

Figure 2:
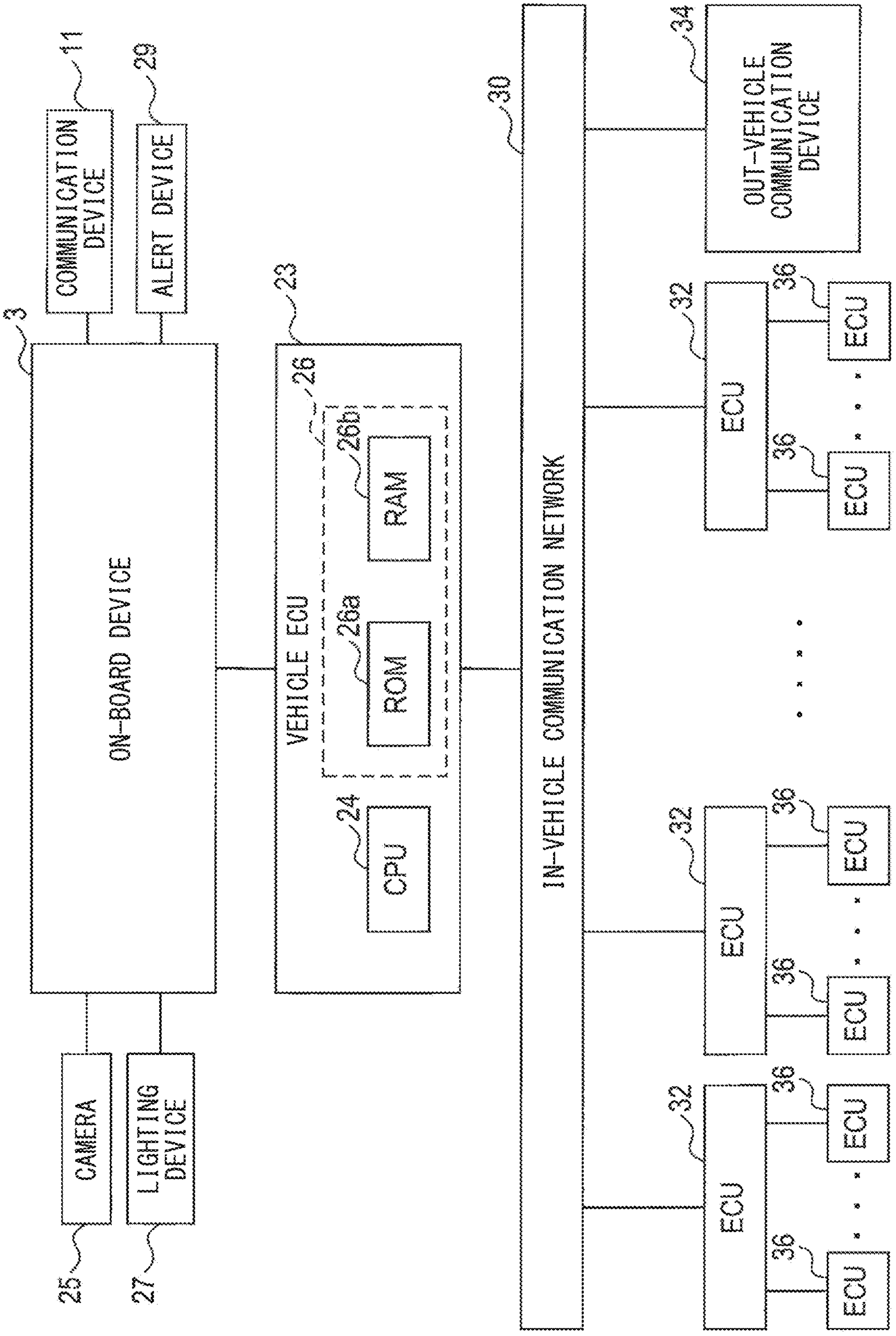
FIG. 2 is a block diagram illustrating a hardware configuration mounted on a vehicle according to the first embodiment.

As illustrated in FIG. 2, in the vehicle 9, the vehicle ECU 23 includes a CPU 24 and a memory 26 of a ROM 26*a*, a RAM 26*b*, and the like, as a configuration for performing various arithmetic processes.

The vehicle ECU 23 is connected to multiple ECUs 32 and an out-vehicle communication device 34 that communicates with an outside of the vehicle, via an in-vehicle communication network 30 that performs communication inside the vehicle. Each ECU 32 is connected to each of other ECUs 36 to be capable of communicating with each other.

The vehicle ECU 23 manages the multiple ECUs 32, thereby achieving coordinated control of the entire vehicle 9. Each ECU 32 is provided for each domain that is divided according to a function in the vehicle 9, and is capable of mainly controlling the multiple ECUs 36 that exist within that domain. The domain includes, for example, power train, body, chassis, cockpit, and the like. The ECU 36 is an ECU that controls, for example, a sensor or an actuator.

The network inside the vehicle 9 is used to transmit and receive a frame including various types of information between the respective components inside the vehicle 9 (for example, the on-board device 3, the ECUs 23, 32, and 36, the out-vehicle communication device 34, and the like). An example of this network is the in-vehicle communication network 30. The on-board device 3 is connected to a vehicle battery 50, and shares a power source with other electric configurations inside the vehicle 9.

(On-Board Device)

Next, the on-board device 3 will be described in detail.

The on-board device 3 includes a controller 31 and a storage 33. The controller 31 includes a CPU 35 and a semiconductor memory such as a RAM or a ROM (hereinafter, referred to as a memory 37). The controller 31 is configured, for example, with a microcomputer.

A function of the controller 31 is realized by the CPU 35 executing a program stored in a non-transient physical recording medium (that is, the memory 37). A method corresponding to the program is performed by executing the program.

A method of realizing the various functions of the controller 31 is not limited to software, and some or all of elements may be realized by using one or more pieces of hardware. For example, when the above functions are realized by an electronic circuit that is hardware, the electronic circuit may be realized by a digital circuit including many logic circuits, an analog circuit, or a combination thereof.

In the present first embodiment, the memory 37 stores multiple applications (that is, programs), each configured to detect a target abnormality based on image data from the camera 25 that images the inside of the vehicle 9.

For example, as will be described in detail below, a program for detecting dirt on the seat 40, a program for detecting a left-behind object on the seat 40, and the like are stored.

The storage 33 is a storage capable of storing information. In this storage 33, for example, information on an image captured by the camera 25 (that is, image data) can be stored. The result of analyzing the image (that is, an analysis result) can be stored. The storage 33 may be, for example, a hard disk drive (that is, HDD) or a solid disk drive (that is, SSD).

(Functional Configuration of Controller)

A functional configuration of the controller 31 will be described.

Figure 4:
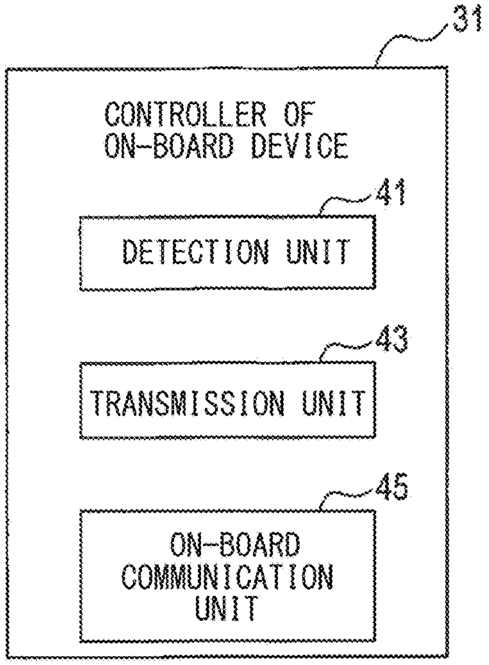
FIG. 4 is a block diagram functionally illustrating a controller of an on-board device according to the first embodiment.

As illustrated in FIG. 4, the controller 31 of the vehicle 9 functionally includes a detection unit 41, a transmission unit 43, and an on-board communication unit 45.

The detection unit 41 is configured to acquire and analyze image data (that is, image data of the pre-image and the post-image described below) captured by the camera 25 when each of the multiple programs (that is, applications) is executed, and to detect an abnormality in the vehicle cabin, such as dirt or a left-behind object on the seat 40.

The transmission unit 43 is configured to drive the communication device 11 to transmit an analysis result that is a detection result of the abnormality (for example, an analysis result that the abnormality is detected) and at least the image data (for example, image data of a pre-image and a post-image) used when the abnormality is detected, to the cloud 5.

The analysis result may be notified from the vehicle 9 to the mobile terminal 15 of a business operator and the mobile terminal 16 of a user.

The on-board communication unit 45 is configured to communicate with the vehicle ECU 23 or communicate with the other ECU 32, 36 via the vehicle ECU 23.

1-3. Cloud Side Configuration

Next, a configuration of the cloud 5 side will be described with reference to FIGS. 1, 3, and 5.

The cloud 5 includes a controller 51, the communication unit 13, and a storage 53. The controller 51 includes a CPU 55 and a semiconductor memory such as a RAM or a ROM (hereinafter, referred to as a memory 57 which is a non-transient physical recording medium). A configuration or a function of the controller 51 basically has the same manner as the configuration or the function of the controller 31 of the vehicle 9, and is realized by the CPU 55 executing a program stored in the memory 57. A method corresponding to the program is performed by executing the program.

The communication unit 13 is capable of wireless communication between the communication device 11 and the mobile terminal 15. For example, the cloud 5 can receive an analysis result or image data transmitted from the vehicle 9 via the communication device 11 and the communication unit 13.

The storage 53 is a storage that stores the same information as the storage 33 of the vehicle 9, and can store the analysis result and the image data received from the vehicle 9.

The cloud 5 configured as described above can collect data on the vehicle 9 transmitted from each of the multiple on-board devices 3 via the communication device 11. Further, the cloud 5 can store the collected data for each vehicle 9 in the storage 53.

The cloud 5 creates a digital twin based on the data of the vehicle 9 stored in the storage 53. The digital twin is normalized index data. The service providing server 7 can acquire data of a predetermined vehicle stored in the storage 53, by using the index data acquired from the digital twin. The service providing server 7 determines a control content of the vehicle 9, and transmits an instruction corresponding to the control content to the cloud 5. The cloud 5 transmits the control content to the vehicle 9 based on the instruction.

(Functional Configuration of Controller)

A functional configuration of the controller 51 will be described.

Figure 5:
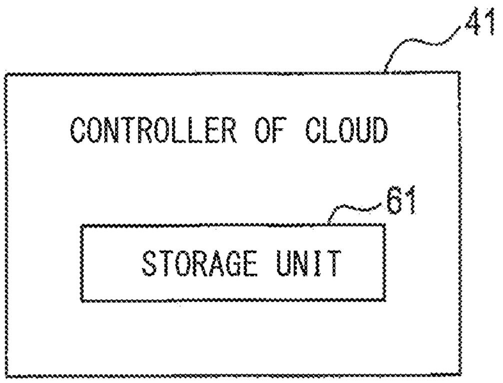
FIG. 5 is a block diagram functionally illustrating a controller of a cloud according to the first embodiment.

As illustrated in FIG. 5, the controller 51 of the cloud 5 functionally includes a storage unit 61.

The storage unit 61 is configured to store an analysis result and image data transmitted from the communication device 11 of the vehicle 9 in, for example, the storage 53.

The analysis result stored in the storage 53 is notified from the cloud 5 via the communication unit 13 to the mobile terminal 15 of a business operator, and may also be notified to the mobile terminal 16 of a user.

1-4. Overall Operation

Next, an overall operation of the abnormality detection system 1 will be described with reference to FIG. 3 or the like, by using a case where car sharing is performed, as an example.

(Operation Before Using Vehicle)

(1) A user who uses the vehicle 9 by using car sharing typically registers and acquires an IC card (not illustrated) to be used when using the vehicle 9.

(2) When the user wishes to use the vehicle 9, the user makes a reservation for use of the vehicle 9 in advance, by using the mobile terminal 16 such as a smartphone.

(3) Next, when using the vehicle 9, the user goes to a location at which the vehicle 9 is parked at a reserved time. Then, the user can hold the IC card over a reader (not illustrated) provided on a window or the like of the vehicle 9 to unlock a door.

(4) For example, when the IC card is held over the reader to unlock the door, the camera 25 can image an interior of the vehicle cabin (that is, a pre-image can be acquired).

(5) Next, the user opens the door, enters the vehicle 9, and obtains a key (not illustrated) for the vehicle 9 accommodated in, for example, a glove box or the like in the vehicle cabin. When acquiring the key, a switch or the like is used to input that the vehicle 9 is in use. Then, the key is used to start an engine of the vehicle 9 and start the vehicle 9.

(Operation after Using Vehicle)

(1) When the use of the vehicle 9 is ended and the vehicle 9 is stopped, the key is returned to a predetermined position in the glove box. When the key is returned, a switch or the like is used to input that the use of the vehicle 9 is ended.

(2) Next, the user opens the door of the vehicle 9, exits, and closes the door.

(3) Next, the door is locked by holding the IC card over the reader of the vehicle 9. Accordingly, the use of the vehicle 9 is completed.

(4) Then, for example, when the IC card is held over the reader to lock the door, the camera 25 can image the interior of the vehicle cabin (that is, a post-image can be acquired).

The example is given here in which the interior of the vehicle cabin is automatically imaged at each of the timings, before entry or after exit, and the interior of the vehicle cabin may also be imaged, for example, upon a command from a business operator (for example, by remote control via the Internet or the like).

(Other Methods of Determination on Before Entry or After Exit)

As a method of determining on before entry (that is, before use) or after exit (that is, after use), a method using that a door is unlocked or locked by an IC card may be considered, as described above. That is, a method can be considered in which a case where the door is unlocked by the IC card is defined as before entry, and a case where the door is locked by the IC card is defined as after exit.

For before entry, a pre-image can be acquired by imaging the interior of the vehicle cabin before entry, and for after exit, a post-image can be acquired by imaging the interior of the vehicle cabin after exit.

Various other methods are considered.

For example, as will be described below, when a door is opened and closed (that is, when the door is opened and then closed) and there is no person in a vehicle cabin, it may be determined as after exit. When the door is opened and closed and there is a person in the vehicle cabin, it may be determined as entry.

For example, when the door is unlocked and it is checked that no person is in the vehicle by, for example, a seating sensor, it may be determined as before entry. Further, for example, when the door is locked after the seating sensor detects a change from a seated state to a non-seated state, it may be determined as after exit.

Further, since a date and time when a user uses the vehicle 9 is reserved, an interior of a vehicle cabin may be automatically imaged and a pre-image obtained, for example, by a control signal from the cloud 5, before a predetermined time of a use start.

In the present first embodiment, the on-board device 3 is powered and in an operable state at least until the pre-image and the post-image are acquired, an abnormality is detected, and an analysis result or image data is transmitted to the cloud 5.

(Process of Vehicle After Use)

(1) When the use of the vehicle 9 is ended, the vehicle 9 (that is, the on-board device 3) detects an abnormality (for example, dirt of the seat 40 or a left-behind object on the seat 40) in the vehicle cabin, based on an image captured before entry (that is, the pre-image) and an image captured after exit (that is, the post-image) described above. A method of detecting this abnormality will be described in detail below.

(2) Next, data of both the images (that is, image data) is analyzed to determine whether there is an abnormality in the vehicle cabin. Then, the analysis result and the image data used in the analysis are transmitted from the vehicle 9 to the cloud 5.

The analysis result includes a case where an abnormality is detected (that is, in an abnormal case) or a case where no abnormality is detected (that is, in a normal case), and it is desirable to transmit the analysis results for both the abnormal and normal cases to the cloud 5. For only the abnormality, a message indicating that "an abnormality is detected" may be transmitted to the cloud 5.

When transmitting image data to the cloud 5, it is conceivable to transmit the image data (that is, the pre-image and the post-image) used to detect the abnormality only when the abnormality is detected. Even when the image data is normal, the image data may be transmitted to the cloud 5.

A second embodiment has the same manner in that the analysis result and the image data are transmitted only when the abnormality is detected, or the analysis result and the image data are transmitted regardless of whether the abnormality is detected or normal.

(3) In the cloud 5, the analysis result (for example, the presence or absence of dirt or a left-behind object) and the image data transmitted from the vehicle 9 are stored in the storage 53.

(4) In the cloud 5, when an abnormality such as dirt or left-behind object is detected, the analysis result is transmitted to the mobile terminal 15 of a business operator. Even when no abnormality is detected, the analysis result may be transmitted to the mobile terminal 15.

The analysis result may be transmitted to the mobile terminal 16 of a user, for example, for a left-behind object. In this case, the alert device 29 such as a speaker may be used to notify the user that there is the left-behind object.

1-5. Method of Detecting Abnormality

Next, a method of detecting an abnormality in a vehicle cabin (for example, dirt of the seat 40 or a left-behind object on the seat 40) will be described.

Since a process of detecting dirt of the seat 40 is different from a process of detecting a left-behind object on the seat 40, for example, the dirt of the seat 40 is detected by using one application (that is, a dirt detection application) and the left-behind object on the seat 40 is detected by using another application (that is, a left-behind object detection application).

In the present first embodiment, the dirt detection application and the left-behind object detection application are used to compare a pre-image captured before entry with a post-image captured after exit, and a difference between the pre-image and the post-image is used to detect an abnormality such as dirt or a left-behind object of the seat 40.

For example, the difference between the pre-image and the post-image is obtained (that is, a difference image is obtained), and an abnormality is detected based on the difference. When obtaining the difference, in order to reduce erroneous detection due to a difference in brightness (that is, luminance), the luminance of the pre-image and the post-image is adjusted, and the difference can be detected accurately. For example, well-known gamma correction is applied to the pre-image and the post-image or to one of the pre-image and the post-image, for adjusting the two images to be compared to a constant gamma value (that is, adjusting the two images to have the same luminance value). Accordingly, accuracy of foreign substance detection can be improved.

For example, when an infrared camera is used as the camera 25, a difference in state or the like of dirt of an imaging target will be clearly visible in the image. Therefore, for example, when there is dirt on the seat 40, a difference image corresponding to the dirt (that is, an image including a difference region corresponding to the dirt) is obtained from a pre-image and a post-image captured by the infrared camera. In this manner, when the difference image is obtained from the pre-image and the post-image, it can be determined that there is dirt on the seat 40. That is, when there is a difference between the pre-image and the post-image (that is, when there is a difference region), it can be determined that there is an abnormality such as dirt.

When the same imaging target is imaged by the multiple cameras 25 arranged in different positions (that is, imaging positions), a three-dimensional object can be detected as is well known. Therefore, when there is a three-dimensional object on the seat 40, it can be determined that there is a left-behind object.

In addition, dirt, a left-behind object, or the like may be detected by applying information obtained by well-known machine learning to the captured image.

1-6. Control Process

Next, a control process executed by the abnormality detection system 1 will be described with reference to FIG. 6 and FIG. 7.

This control process includes a process performed by the controller 31 of the vehicle 9 and a process performed by the controller 51 of the cloud 5.

(Dirt Detection Process)

This dirt detection process is a process executed by a dirt detection application.

Figure 6:
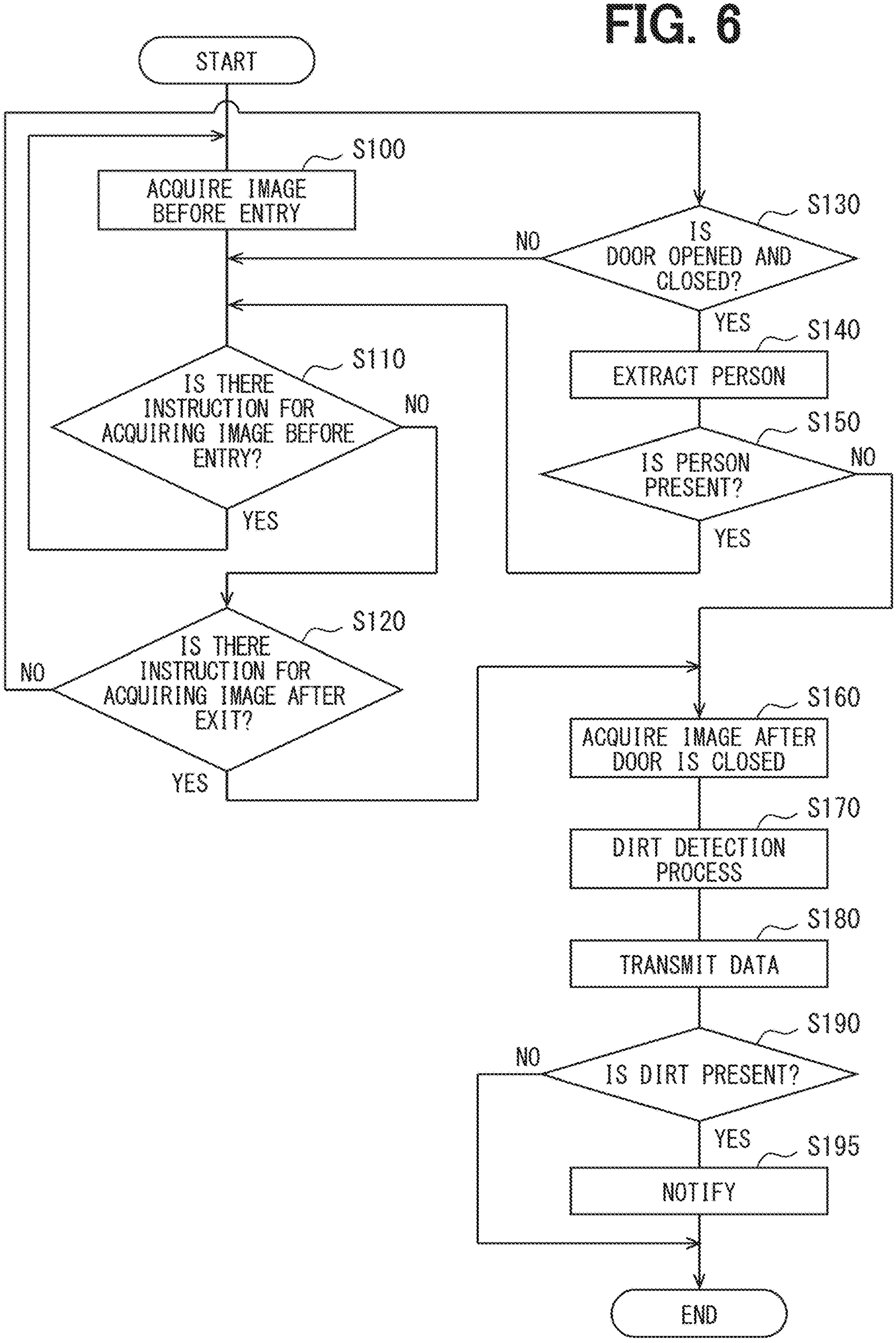
FIG. 6 is a flowchart illustrating a dirt detection process according to the first embodiment.

As illustrated in FIG. 6, in step (hereinafter indicated by S) 100, before entry, an interior of a vehicle cabin is imaged by the camera 25 (for example, an infrared camera) to obtain an image of the interior of the vehicle cabin (that is, a pre-image). For example, when a door is unlocked by an IC card, before entry is considered, so at that time, the interior of the vehicle cabin is imaged to obtain the pre-image. When imaging, the lighting device 27 is turned on to illuminate the interior of the vehicle cabin.

Next, in S110, it is determined whether there is an instruction from the mobile terminal 15 of a business operator to image the interior of the vehicle cabin before entry. When an affirmative determination is made, the process returns to S100, and the interior of the vehicle cabin before entry is imaged. On the other hand, when a negative determination is made, the process proceeds to S120. In the returning to S100, when the pre-image is already acquired, two pre-images captured at different times are acquired, and either image may be used as the pre-image.

In S120, it is determined whether there is an instruction from the mobile terminal 15 of the business operator to image the interior of the vehicle cabin after entry. When an affirmative determination is made here, the process proceeds to S160. On the other hand, when a negative determination is made, the process proceeds to S130.

In S130, it is determined whether a door of the vehicle 9 is opened and closed based on a signal from a sensor such as a door switch. When it is determined that the door is opened and closed, the process proceeds to S140. On the other hand, when a negative determination is made, the process returns to S110.

In S140, since the door is opened and closed, it is possible that a person enters the vehicle 9. Therefore, extraction of the person in the vehicle cabin (that is, detecting a person) is performed. For example, the interior of the vehicle cabin is imaged by the camera 25, and the image data is analyzed (that is, by well-known image recognition) to extract the person. The extraction of the person may be performed by using a known seating sensor that detects that a person sits on the seat 40, or a temperature sensor that detects a body temperature of the person.

Next, in S150, it is determined whether a person is present in the vehicle cabin, according to a result of the person extraction process in S140. When an affirmative determination is made here, the process returns to S110. On the other hand, when a negative determination is made, the process proceeds to S160. In the returning to S110, the process waits until the door is opened and closed again.

In S160, a post-image is acquired after the door is closed. In other words, since no person enters the vehicle 9 after the door is opened and closed, it is assumed that the door is in a closed state when the person exits (that is, exit), and the interior of the vehicle cabin is imaged to obtain an image after exit (that is, a post-image). When imaging, the lighting device 27 is turned on to illuminate the interior of the vehicle cabin.

Next, in S170, a process of detecting dirt adhering to the seat 40 or the like is performed.

Specifically, as described above in the “method of detecting abnormality”, when detecting dirt of the seat 40 or the like, for example, a difference between a pre-image and a post-image captured by an infrared camera can be obtained, and the dirt can be detected based on this difference. That is, when there is dirt on the seat 40, a difference image corresponding to the dirt is obtained between the pre-image and the post-image. Therefore, when such a difference image is obtained, it can be determined that there is dirt on the seat 40.

Next, in S180, a dirt detection result (that is, an analysis result) is transmitted to the cloud 5. Here, the analysis result may be transmitted only when there is dirt, and the analysis result may also be transmitted even when there is no dirt. When transmitting the analysis result, for example, when dirt is detected, image data of the pre-image and the post-image used to detect the dirt are transmitted to the cloud 5. The analysis result and the image data are stored in the storage 53.

Next, in S190, it is determined whether dirt is present based on the analysis result transmitted from the vehicle 9 to the cloud 5. When an affirmative determination is made, the process proceeds to S195. On the other hand, when a negative determination is made, the present process is temporarily ended.

In S195, since dirt is present on the seat 40 or the like, this fact (that is, the analysis result indicating that dirt is detected) is transmitted to the mobile terminal 15 of the business operator (that is, the analysis result is notified to the business operator), and the present process is temporarily ended. At that time, the analysis result may be transmitted to the mobile terminal 16 of a user (that is, the analysis result may be notified to the user) or may be notified to the user by the alert device 29.

In the present process, the processes of S100 to S180 are performed in the vehicle 9, and the processes of S190 and S195 are performed in the cloud 5.

In addition to the processes described above, the result of the dirt detection in S170 (for example, the analysis result indicating that dirt is detected) may be notified to the mobile terminal 15 of the business operator or the mobile terminal 16 of the user before the process in S180. In this case, the determination in S190 and the notification in S195 can be omitted.

(Left-Behind Object Detection Process)

This left-behind object detection process is a process performed in a left-behind object detection application.

In the present left-behind object detection process, left-behind object detection is performed by using a pre-image and a post-image used in the dirt detection process. In the present left-behind object detection process as well, in the same manner as the dirt detection process, a process of acquiring the pre-image and the post-image by imaging may be performed.

Figure 7:
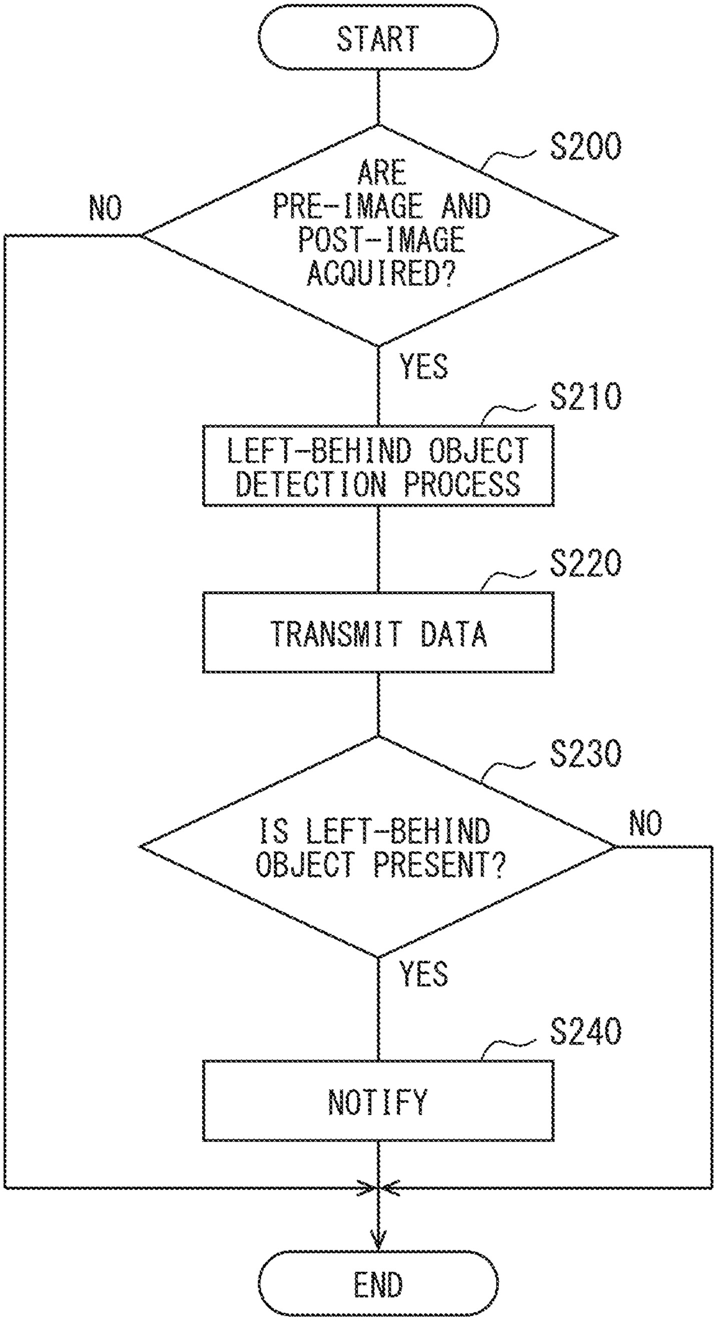
FIG. 7 is a flowchart illustrating a left-behind object detection process according to the first embodiment.

As illustrated in FIG. 7, in S200, it is determined whether a pre-image and a post-image are acquired in the dirt detection process. When an affirmative determination is made, the process proceeds to S210. On the other hand, when a negative determination is made, the present process is temporarily ended.

In S210, a process of detecting a left-behind object is executed.

Specifically, as described above in the “method of detecting abnormality”, when detecting a left-behind object on the seat 40 or the like, an image captured by the camera 25 such as an infrared camera can be used. For example, by capturing the same imaging target (for example, the same seat 40) with the multiple cameras 25, a three-dimensional object (that is, a left-behind object) on the seat 40 can be detected.

Next, in S220, a result of detecting of the left-behind object (that is, an analysis result) is transmitted to the cloud 5. Here, the analysis result may be transmitted only when there is a left-behind object, and the analysis result may also be transmitted even when there is no left-behind object. When transmitting the analysis result, for example, when there is a left-behind object, image data of a pre-image and a post-image used to detect the left-behind object are transmitted to the cloud 5. The analysis result and the image data are stored in the storage 53.

Next, in S230, it is determined whether a left-behind object is present based on the analysis result transmitted from the vehicle 9 to the cloud 5. When an affirmative determination is made, the process proceeds to S240. On the other hand, when a negative determination is made, the present process is temporarily ended.

In S240, since a left-behind object is present on the seat 40 or the like, this fact (that is, the analysis result indicating that the left-behind object is detected) is transmitted to the mobile terminal 15 of a business operator (that is, the analysis result is notified to the business operator), and the present process is temporarily ended. At that time, the analysis result may be transmitted to the mobile terminal 16 of a user (that is, the analysis result may be notified to the user) or may be notified to the user by the alert device 29.

In the present process, the processes of S200 to S220 are performed in the vehicle 9, and the processes of S230 and S240 are performed in the cloud 5.

In addition to the process described above, the result of the detection of the left-behind object in S210 (for example, the analysis result indicating that a left-behind object is detected) may be notified to the mobile terminal 15 of the business operator or the mobile terminal 16 of the user before the process of S220. In this case, the determination in S230 and the notification in S240 can be omitted.

In principle, in the on-board device 3, when an ignition 52 (for example, an ignition switch illustrated in FIG. 1) of the vehicle 9 is turned off, the operation (that is, start-up) of the on-board device 3 is ended. That is, the power supply from the vehicle battery 50 is cut off, resulting in a power-off state. Meanwhile, when the dirt detection or left-behind object detection application described above is operating, the on-board device 3 will remain the start-up and the process will be executed until the process of each application is ended (that is, until each step of the flowchart in FIG. 6 or FIG. 7 is ended) even when the ignition 52 is turned off in the middle of the process. When the process is completed up to the end of each flowchart, the power is turned off. When both the applications are executed, the power is turned off when the processes of both flowcharts are completed up to the end.

The power-off operation has the same manner as an application for the second embodiment and the like.

1-7. Effects

With the present embodiment, the following effects can be obtained.

(1a) In the present first embodiment, it is possible to suitably detect an abnormality such as dirt or a left-behind object in a vehicle cabin, and this technology is preferable for, for example, a business operator of car sharing for a user who uses the vehicle 9.

Specifically, when the on-board device 3 executes each of multiple applications, each image data is analyzed to detect an abnormality, and an analysis result obtained by the detection unit 41 and at least the image data (that is, predetermined image data) used when the abnormality is detected are transmitted to the cloud 5. Meanwhile, the cloud 5 stores the analysis result and the predetermined image data transmitted from the transmission unit 43. Then, the analysis result is notified to the business operator and the user from the on-board device 3 or the cloud 5.

In this manner, in the present first embodiment, the on-board device 3 can detect the abnormality such as dirt based on the image data obtained by imaging an inside the vehicle 9. By transmitting the analysis result such as a detection result of the abnormality and the predetermined image data to the cloud 5, the analysis result and the image data can be stored in the cloud 5.

Accordingly, the analysis result and the image data (for example, image data that is a basis for the abnormality) can be stored reliably, this provides a solid basis for taking measures based on the analysis result. Since the analysis result is notified to a business operator or a user, the business operator or the user who receives the notification can take appropriate measures depending on the contents of the notification. By performing the abnormality detection in the on-board device 3, there is an advantage that occurrence of the abnormality can be promptly notified to the user or the like, as necessary.

(1b) In the present first embodiment, dirt of the seat 40 and a left-behind object on the seat 40 can be detected.

(1c) In the present first embodiment, an infrared camera can be used as the camera 25. Therefore, an abnormality of the seat 40 or the like can be easily detected with an image captured by the infrared camera.

(1d) In the present first embodiment, since the lighting device 27 that illuminates an imaging target is turned on when imaging with the camera 25, a clear image can be obtained. Therefore, the abnormality of the seat 40 or the like can be easily detected from the image.

(1e) In the present first embodiment, an abnormality of the seat 40 or the like can be easily detected based on a difference between image data of a pre-image (that is, pre-image data) obtained by the camera 25 imaging the interior of the vehicle cabin before the user enters the vehicle 9, and image data of a post-image (that is, post-image data) obtained by the camera 25 imaging the interior of the vehicle cabin after the user exits the vehicle 9.

(1f) In the present first embodiment, when detecting an abnormality based on the difference between the pre-image data and the post-image data, luminance adjustment is performed between the pre-image data and the post-image data, thereby reducing erroneous detection of the abnormality due to a difference in brightness between the pre-image and the post-image.

(1g) In the present first embodiment, it is possible to determine between dirt and a left-behind object.

(1h) In the present first embodiment, when an instruction for imaging the interior of the vehicle cabin is received from an outside of the vehicle 9 (for example, from the business operator), it is possible to perform imaging by the camera 25. Then, an abnormality can be detected based on the image data obtained by imaging.

1-8. Correspondence Relationship

Next, a relationship between the present first embodiment and the present disclosure will be described.

The vehicle 9 corresponds to a vehicle, the cloud 5 corresponds to a cloud, the on-board device 3 corresponds to an on-board device, the abnormality detection system 1 corresponds to an abnormality detection system, the camera 25 corresponds to a camera, the detection unit 41 corresponds to a detection unit, the transmission unit 43 corresponds to a transmission unit, the storage unit 61 corresponds to a storage unit, and the vehicle ECU 23 corresponds to a relay device.

1-9. Modification

Next, a modification of the present first embodiment will be described.

Figure 8:
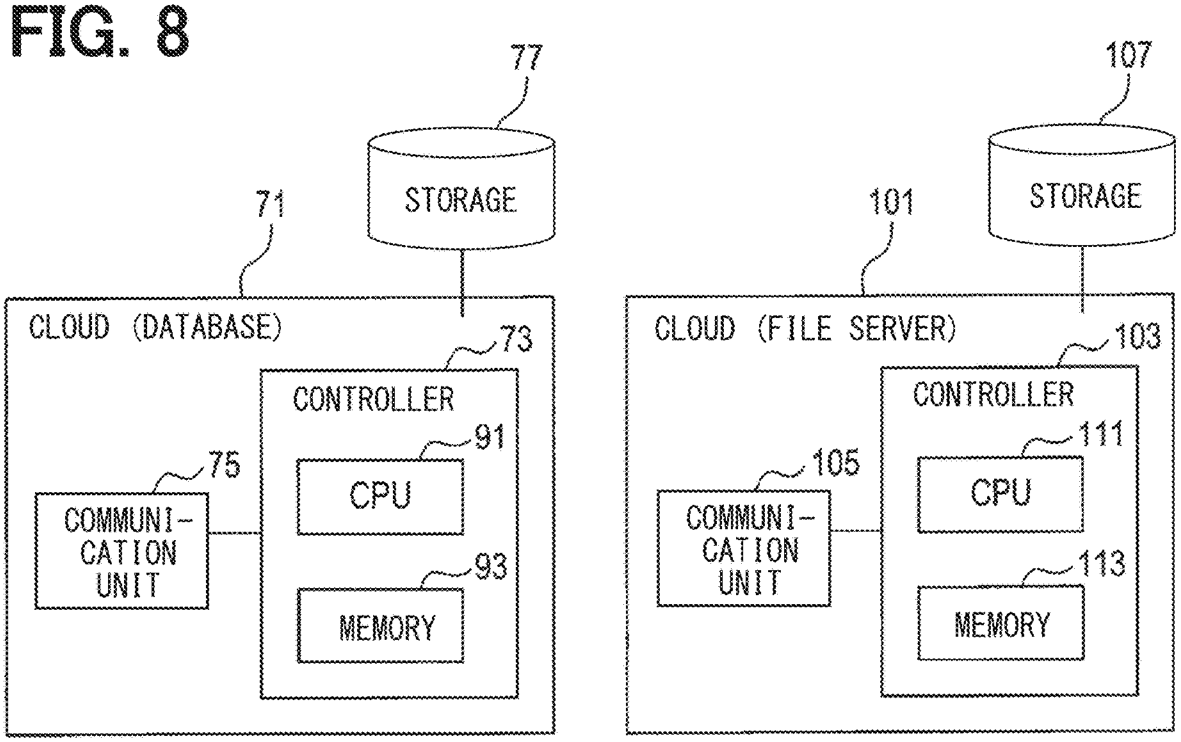
FIG. 8 is a block diagram illustrating a configuration of a modification.

As a configuration on the cloud 5 side, a configuration illustrated in FIG. 8, which is managed by the cloud 5 (that is, a management server), can be adopted. In other words, a known cloud service may be used to record an analysis result in a database 71, and record image data in a file server 101.

Specifically, as the database 71, a configuration can be adopted in which a controller 73 having a CPU 91 and a memory 93, and a communication unit 75 are included, and the analysis result transmitted from the management server to the database 71 is stored in a storage 77.

As the file server 101, a configuration can be adopted in which a controller 103 having a CPU 111 and a memory 113, and a communication unit 105 are included, and the image data transmitted from the management server to the file server 101 is stored in a storage 107.

2. Second Embodiment

Since a second embodiment has a basic configuration in the same manner as the first embodiment, the following description will mainly focus on a difference from the first embodiment. The same reference numerals as those in the first embodiment indicate the same configuration, and the preceding description will be referred to.

A hardware configuration of the present second embodiment has the same manner as the first embodiment, so a description thereof will be omitted.

The abnormality detection system 1 of the present second embodiment includes a first application and a second application that are each configured to detect a target abnormality, based on image data from the camera 25 that images an inside of the vehicle 9. The abnormality detected by the first application is notified with an urgency level higher than an urgency level when the abnormality is detected than the abnormality detected by the second application.

2-1. Functional Configuration

Figure 9:
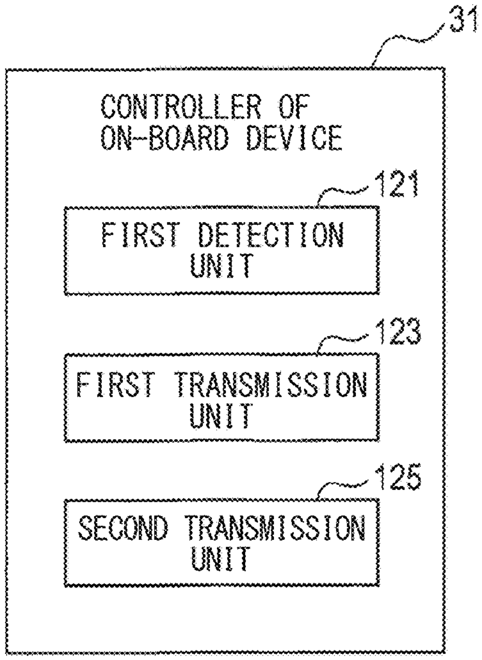
FIG. 9 is a block diagram functionally illustrating a controller of an on-board device according to a second embodiment.

As illustrated in FIG. 9, in the present second embodiment, a controller of the on-board device 3 functionally includes a first detection unit 121, a first transmission unit 123, and a second transmission unit 125.

The first detection unit 121 is configured to analyze image data and detect an abnormality when the first application is executed.

The first transmission unit 123 is configured to transmit an analysis result analyzed by the first detection unit 121 to the cloud 5, and to transmit at least the image data used when the abnormality is detected to the cloud 5.

The second transmission unit 125 is configured to transmit the image data to the cloud 5 when the second application is executed.

Figure 10:
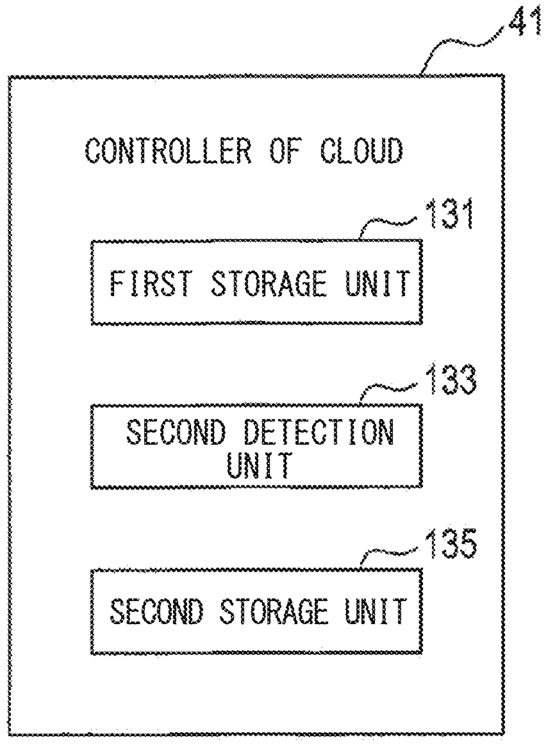
FIG. 10 is a block diagram functionally illustrating a controller of a cloud according to the second embodiment.

As illustrated in FIG. 10, the controller 51 of the cloud 5 includes a first storage unit 131, a second detection unit 133, and a second storage unit 135.

The first storage unit 131 is configured to store the analysis result and the image data transmitted from the first transmission unit 123 when the first application is executed.

The second detection unit 133 is configured to analyze the image data transmitted from the second transmission unit 125 and detect an abnormality when the second application is executed.

The second storage unit 135 is configured to store the image data transmitted from the second transmission unit 125 and the analysis result analyzed by the second detection unit 133.

The analysis result is notified from at least one of the on-board device 3 or the cloud 5 to at least one of the mobile terminal 15 of a business operator and the mobile terminal 16 of a user.

2-2. Control Process (Living Body Detection Process)

This living body detection process is a process with a high urgency level (that is, priority) to be notified (that is, a process by the first application).

Figure 11:
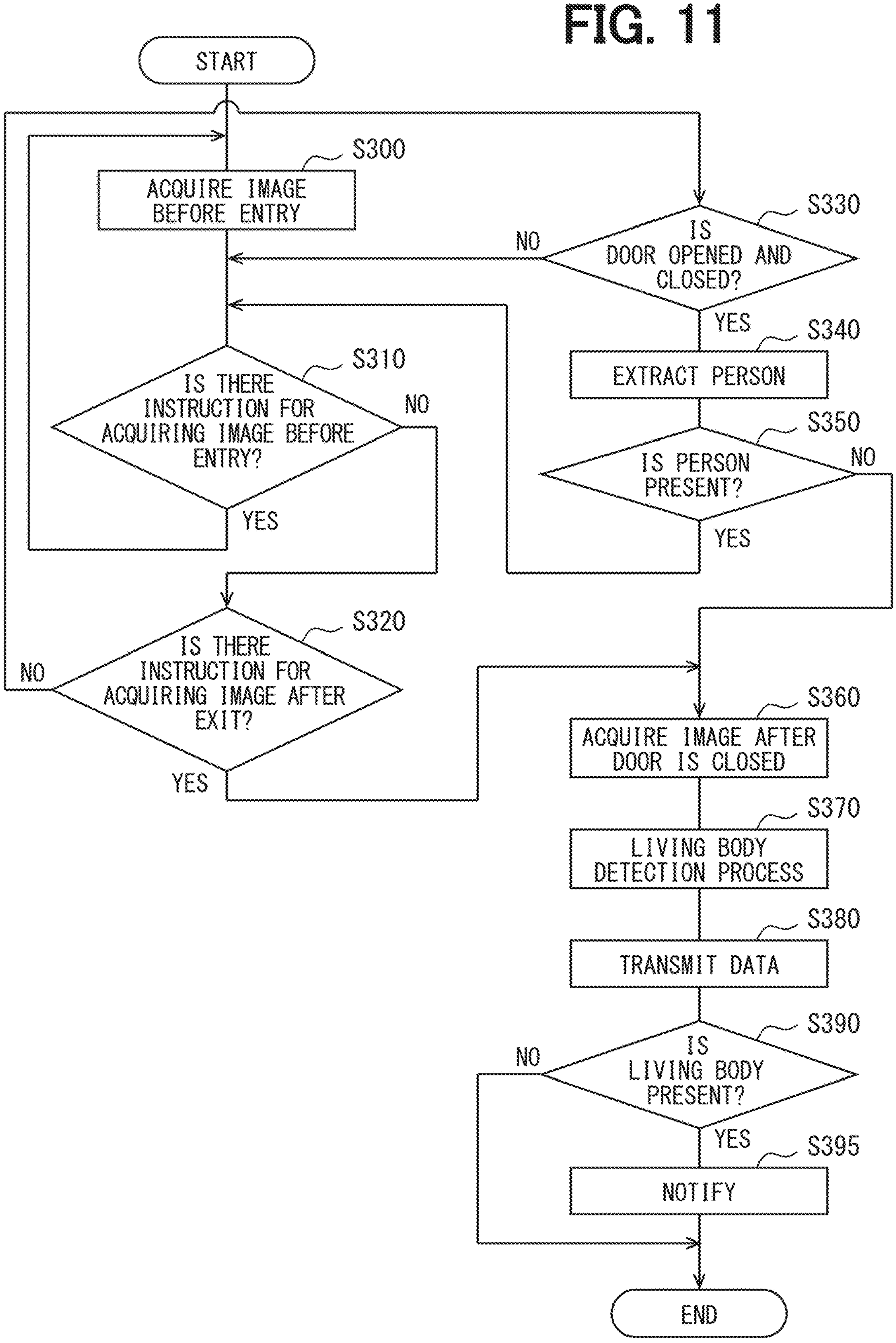
FIG. 11 is a flowchart illustrating a living body detection process according to the second embodiment.

As illustrated in FIG. 11, in S300 to S360 of the present second embodiment, the same processes as the processes in S100 to S360 of the first embodiment are performed.

Next, in S370, the on-board device 3 performs the living body detection process. This living body detection process is a process of detecting a living thing (that is, a living body) such as a child such as a baby, an elderly person, or a pet.

As a method of detecting a living body, first, any abnormality is detected from a difference between the pre-image and the post-image described above. That is, when there is a difference region corresponding to the image difference, it is determined that some abnormality is present. Then, there is a method in which for a target object with which the abnormality is detected, for example, a well-known image recognition process is used to detect whether the target object is a baby, a pet, or the like. At that time, it is also conceivable to improve detection accuracy by detecting a temperature of the target object. By adopting the method of detecting a three-dimensional object described above, the detection accuracy can be further improved.

Next, in S380, a result of the detection of the living body is transmitted to the cloud 5. Here, the analysis result may be transmitted only when a living body is detected, and the analysis result may also be transmitted even when a living body is not detected. When transmitting the analysis result (for example, when a living body is detected), image data of the pre-image and the post-image used to detect the living body is transmitted to the cloud 5. The analysis result and the image data are stored in the storage 53.

Next, in S390, it is determined whether a living body is present based on the analysis result transmitted from the vehicle 9 to the cloud 5. When an affirmative determination is made here, the process proceeds to S395. On the other hand, when a negative determination is made, the present process is temporarily ended.

In S395, since a living body is present on the seat 40 or the like, this fact (that is, an analysis result indicating that the living body is detected) is transmitted to the mobile terminal 15 of a business operator and also to the mobile terminal 16 of a user, and the present process is temporarily ended. In this case, it is preferable to use the alert device 29 to promptly notify the user who is presumed to be near the vehicle 9.

In the present process, the processes of S300 to S380 are performed in the vehicle 9, and the processes of S390 and S395 are performed in the cloud 5.

In addition to the process described above, the result of the detection of the living body in S370 (for example, the analysis result indicating that the living body is detected) may be notified to the mobile terminal 15 of the business operator and the mobile terminal 16 of the user before the process of S380. In this case, the determination in S390 and the notification in S395 can be omitted.

(Dirt Detection Process)

This dirt detection process is a process having a lower notification priority than the living body detection process (that is, a process by the second application). Instead of the dirt detection process, the left-behind object detection process described above may be performed.

Regarding this dirt detection process, the dirt detection process is performed by using the pre-image and the post-image used in the living body detection process. In the present dirt detection process, in the same manner as the dirt detection process of the first embodiment, a process of imaging and acquiring the pre-image and the post-image may be performed.

Figure 12:
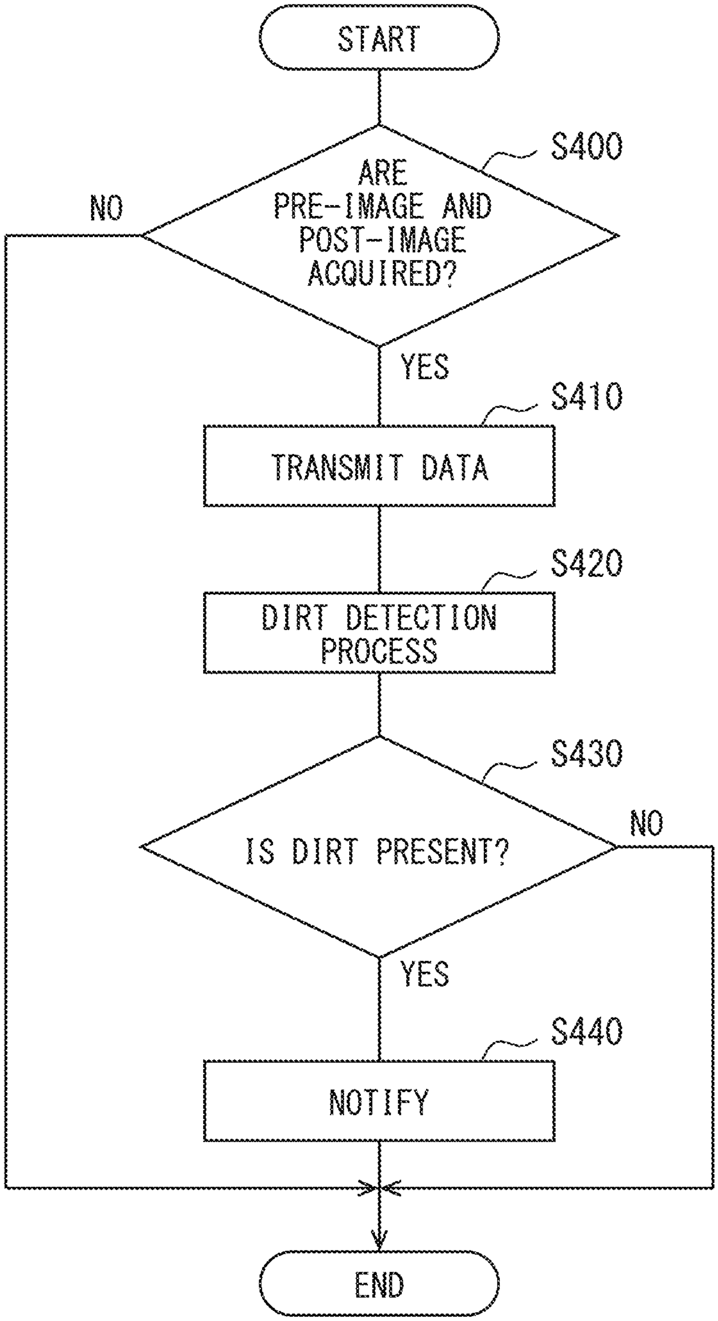
FIG. 12 is a flowchart illustrating a dirt detection process according to the second embodiment.

As illustrated in FIG. 12, in S400, it is determined whether a pre-image and a post-image are acquired by the first application. When an affirmative determination is made here, the process proceeds to S410. On the other hand, when a negative determination is made, the present process is temporarily ended.

Next, in S410, image data of the pre-image and the post-image is transmitted to the cloud 5. The image data is stored in the storage 53.

Next, in S420, the cloud 5 performs a process of detecting dirt in the same method as in the first embodiment. An analysis result is stored in the storage 53.

Next, in S430, it is determined whether dirt is present based on the analysis result of S420. When an affirmative determination is made here, the process proceeds to S440. On the other hand, when a negative determination is made, the present process is temporarily ended.

In S440, since dirt is present on the seat 40 or the like, this fact (that is, the analysis result indicating that dirt is detected) is transmitted to the mobile terminal 15 of a business operator (that is, the analysis result is notified to the business operator), and the present process is temporarily ended. At that time, the analysis result may be transmitted to the mobile terminal 16 of a user (that is, the analysis result may be notified to the user). The user may also be notified by the alert device 29.

In the present process, the processes of S400 and S410 are performed in the vehicle 9, and the processes of S420 to S440 are performed in the cloud 5.

The present second embodiment provides the same effects as the first embodiment. Further, in the present second embodiment, the process of detecting a living body such as a baby or a pet is executed promptly after exit, and when a baby, a pet, or the like is detected, a prompt alert is notified to the user or the business operator, thereby providing the effect of high safety.

As modifications of the present second embodiment, the following examples can be given.

Specifically, as a process of which the urgency level of notification is high, a left-behind object detection process in the same manner as the first embodiment can be adopted, instead of the living body detection process. In this case, the living body detection process of S370 can be replaced by the left-behind object detection process such as S210, and the living body presence determination process of S390 can be replaced by the left-behind object presence determination process such as S230.

3. Other Embodiments

Although the embodiments of the present disclosure were described above, it is needless to state that the present disclosure is not limited to the aforementioned embodiment and that various configurations can be employed.

(3a) The present disclosure can be applied to a service in which a vehicle is shared by multiple users. For example, the present disclosure can be applied to a car sharing service and a rental car service.

(3b) As multiple applications, two or more applications may be adopted.

(3c) An abnormality in a vehicle cabin includes the presence of dirt, a left-behind object, a broken part, or a living body after exit. A location of the abnormality includes a seat and a location other than the seat (for example, a door, a window, a floor, and a dashboard).

(3d) Regarding a method of detecting dirt, a left-behind object, and a living body, various methods other than the detection method described above can be adopted. For example, a difference in material of an imaging target can be seen from images captured with an infrared camera, and based on the difference between the pre-image and the post-image, it is possible to determine whether the imaging target is, for example, a seat or an object other than the seat, such as paper, clothing or a bag (that is, a left-behind object).

(3e) Image data to be transmitted from the vehicle side to the cloud side includes image data used to detect an abnormality (for example, image data of a pre-image and a post-image) when the abnormality is detected. Meanwhile, even when no abnormality is detected, the image data may be transmitted for a check.

(3f) The abnormality detection system and the abnormality detection method described in the present disclosure may be realized by a dedicated computer provided by forming a processor and a memory programmed to perform one or more functions embodied by a computer program.

Alternatively, the abnormality detection system and the abnormality detection method described in the present disclosure may be realized by a dedicated purpose computer provided by forming a processor with one or more dedicated hardware logic circuits.

Alternatively, the abnormality detection system and abnormality detection method described in the present disclosure may be realized by one or more dedicated computers configured with a combination of a processor and memory programmed to execute one or more functions, and a processor configured with one or more hardware logic circuits.

The computer program may be stored in a non-transient physical computer-readable recording medium as an instruction to be executed by a computer. A method for realizing functions of each unit provided in the abnormality detection system does not necessarily include software, and all the functions may be realized using one or more pieces of hardware.

(3g) In addition to the abnormality detection system described above, the present disclosure can be realized in various forms, such as a program for causing a computer of the abnormality detection system to function, a non-transient physical recording medium such as a semiconductor memory on which this program is recorded, and a control method.

(3h) The multiple functions of single component in each of the embodiments described above may be realized by multiple components, and one function of one component may be realized by multiple components. Multiple functions belonging to multiple components may be realized by one component, or one function realized by multiple components may be realized by one component. A part of the configuration of each of the embodiments described above may be omitted. At least the part of the configuration of each of the embodiments described above may be added to or substituted for a configuration of another embodiment.

What is claimed is:

1. An abnormality detection system detecting an abnormality in a vehicle cabin, the abnormality detection system comprising:

a cloud collecting data of a vehicle;

an on-board device communicatively connected to the cloud; and a plurality of applications each configured to detect the abnormality as a target based on image data of an image captured by a camera, the camera capturing the image indicating an interior of the vehicle cabin, wherein the on-board device includes at least one processor with a memory storing computer program code, the at least one processor with the memory is configured to cause the on-board device to:

analyze the image data and detecting the abnormality when each of the plurality of applications is executed; and transmit, to the cloud, an analysis result of the image data and at least the image data from which the abnormality is detected, the cloud includes at least one processor with a memory storing computer program code, wherein the at least one processor with the memory is configured to cause the cloud to store, in a storage, the analysis result of the image data and the image data, which are transmitted from the board device, and at least one of the on-board device or the cloud notifies a notification target of the analysis result of the image data, the abnormality is detected based on a difference between pre-image data, which is obtained from the camera when the camera captures the image of the interior of the vehicle cabin before a user enters the vehicle, and post-image data, which is obtained from the camera when the camera captures the image of the interior of the vehicle cabin after the user exits the vehicle, and a brightness of the pre-image data and a brightness of the post-image data are adjusted when detecting the abnormality based on the difference between the pre-image data and the post-image data.

2. An abnormality detection system detecting an abnormality in a vehicle cabin, the abnormality detection system comprising:

a cloud collecting data of a vehicle;

an on-board device communicatively connected to the cloud; and a first application and a second application each configured to detect the abnormality as a target based on image data of an image captured by a camera, the camera capturing the image indicating an interior of the vehicle cabin, wherein the abnormality detected by the first application has an urgency level higher than an urgency level of the abnormality detected by the second application, the urgency level indicating a level to notify the abnormality in response to the abnormality being detected, the on-board device includes at least one processor with a memory storing computer program code, the at least one processor with the memory is configured to cause the on-board device to:

analyze the image data and detecting the abnormality when the first application is executed;

transmit, to the cloud, an analysis result of the image data and at least the image data from which the abnormality is detected; and transmit, to the cloud, the image data when the second application is executed, the cloud includes at least one processor with a memory storing computer program code, wherein the at least one processor with the memory is configured to cause the cloud to:

store, in a first storage, the analysis result of the image data and the image data transmitted from the on-board device when the first application is executed;

analyze the image data transmitted from the on-board device and detecting the abnormality, the image data being transmitted from the on-board device in response to execution of the second application; and store, in a second storage, the image data transmitted from the on-board device and an analysis result of the image data, and at least one of the on-board device or the cloud notifies a notification target of the analysis result.

3. An abnormality detection system detecting an abnormality in a vehicle cabin, the abnormality detection system comprising:

a cloud collecting data of a vehicle; and an on-board device communicatively connected to the cloud and communicatively connected to a relay device that relays a frame communicated through a network of the vehicle, wherein the on-board device includes at least one processor with a memory storing computer program code, the at least one processor with the memory is configured to cause the on-board device to:

perform an on-board communication with an electronic control device connected to the network of the vehicle via the relay device;

analyze image data of an image captured by a camera and detecting the abnormality in the vehicle cabin, the camera capturing the image indicating an interior of the vehicle cabin; and transmit, to the cloud, an analysis result of the image data and at least the image data from which the abnormality is detected, and notify the analysis result of the image data toward outside of the vehicle, the abnormality is detected based on a difference between pre-image data, which is obtained from the camera when the camera captures the image of the interior of the vehicle cabin before a user enters the vehicle, and post-image data, which is obtained from the camera when the camera captures the image of the interior of the vehicle cabin after the user exits the vehicle, and a brightness of the pre-image data and a brightness of the post-image data are adjusted when detecting the abnormality based on the difference between the pre-image data and the post-image data.

4. The abnormality detection system according to claim 1, wherein the abnormality is related to a seat of the vehicle, and includes at least dirt of the seat or a left-behind object on the seat.

5. The abnormality detection system according to claim 1, wherein the camera is an infrared camera.

6. The abnormality detection system according to claim 1, wherein, when the camera captures the image of a target, the camera is configured to emit a light that illuminates the target to be captured by the camera.

7. The abnormality detection system according to claim 1, wherein the abnormality is dirt or a left-behind object in the vehicle cabin.

8. The abnormality detection system according to claim 1, wherein, in response to receiving, from an outside device, an instruction for capturing the image of the vehicle cabin, the camera captures the image of the vehicle cabin and the abnormality is detected based on the image data of the image captured by the camera.

9. The abnormality detection system according to claim 1, wherein the on-board device is connected to a vehicle battery, and the on-board device turns off the camera and turns off the on-board device itself when an ignition of the vehicle is turned off.

10. The abnormality detection system according to claim 9, wherein, when the abnormality is detected after the ignition of the vehicle is turned off, the camera and the on-board device are not turned off until the analysis result is notified toward outside of the vehicle.

11. An abnormality detection system detecting an abnormality in a vehicle cabin, the abnormality detection system comprising:

a cloud collecting data of a vehicle;

an on-board device communicatively connected to the cloud; and a plurality of applications each configured to detect the abnormality as a target based on image data of an image captured by a camera, the camera capturing the image indicating an interior of the vehicle cabin, wherein the on-board device includes at least one processor with a memory storing computer program code, the at least one processor with the memory is configured to cause the on-board device to:

analyze the image data and detecting the abnormality when each of the plurality of applications is executed; and transmit, to the cloud, an analysis result of the image data and at least the image data from which the abnormality is detected, the cloud includes at least one processor with a memory storing computer program code, wherein the at least one processor with the memory is configured to cause the cloud to store, in a storage, the analysis result of the image data and the image data, which are transmitted from the on-board device, at least one of the on-board device or the cloud notifies a notification target of the analysis result, and the on-board device acquires, without an instruction from the cloud, the image data before entry and the image data after exit.

12. An abnormality detection system detecting an abnormality in a vehicle cabin, the abnormality detection system comprising:

a cloud collecting data of a vehicle; and an on-board device communicatively connected to the cloud and communicatively connected to a relay device that relays a frame communicated through a network of the vehicle, wherein the on-board device includes at least one processor with a memory storing computer program code, the at least one processor with the memory is configured to cause the on-board device to:

perform an on-board communication with an electronic control device connected to the network of the vehicle via the relay device;

analyze image data of an image captured by a camera and detecting the abnormality in the vehicle cabin, the camera capturing the image indicating an interior of the vehicle cabin;

transmit, to the cloud, an analysis result of the image data and at least the image data from which the abnormality is detected, notify the analysis result of the image data toward outside of the vehicle, and acquire, without an instruction from the cloud, the image data before entry and the image data after exit.

* * * * *